United States Patent [19]

Ammons

[11] 4,160,853
[45] Jul. 10, 1979

[54] CATALYST FOR MAKING POLYCARBONATE DIOLS FOR USE IN POLYCARBONATE URETHANES

[75] Inventor: Vernon G. Ammons, Glenshaw, Pa.

[73] Assignee: PPG Industries, Inc., Pittsburgh, Pa.

[21] Appl. No.: 855,585

[22] Filed: Nov. 29, 1977

Related U.S. Application Data

[63] Continuation-in-part of Ser. No. 681,012, Apr. 28, 1976, abandoned, which is a continuation-in-part of Ser. No. 385,019, Aug. 2, 1973, abandoned.

[51] Int. Cl.² .................. B32B 27/40; C08G 18/42; C08G 63/62
[52] U.S. Cl. .................. 428/425; 428/412; 428/426; 428/430; 528/85; 528/56; 528/371
[58] Field of Search ............ 428/425, 412, 426, 430; 260/77.5 D, 77.5 AM; 528/85, 56, 371

[56] References Cited

U.S. PATENT DOCUMENTS

| 2,720,502 | 10/1955 | Caldwell | 260/77.5 D |
|---|---|---|---|
| 2,729,618 | 1/1956 | Müller | 260/77.5 D |
| 2,808,390 | 10/1957 | Caldwell | 260/77.5 D |
| 2,901,466 | 8/1959 | Kibler | 260/77.5 D |
| 3,541,183 | 11/1970 | Kallert | 260/77.5 D |
| 3,764,457 | 10/1973 | Chang | 428/412 |
| 4,024,113 | 5/1977 | Ammons | 428/425 |
| 4,103,070 | 7/1978 | Ammons | 428/425 |
| 4,105,641 | 8/1978 | Buysch | 528/85 |

FOREIGN PATENT DOCUMENTS 1011283  11/1965  United Kingdom.

*Primary Examiner*—Ellis P. Robinson
*Attorney, Agent, or Firm*—Donna L. Seidel

[57] ABSTRACT

Energy-absorbing laminates for use in automobile windshields or other safety glass applications comprising a polycarbonate urethane and a sheet of glass are disclosed. The polyurethane is formed from a cycloaliphatic diisocyanate, a compound containing at least two active hydrogens per molecule and having a molecular weight below 250, and a polycarbonate diol prepared by the reaction of an aliphatic diol and a dialkyl carbonate using a titanium catalyst.

22 Claims, No Drawings

CATALYST FOR MAKING POLYCARBONATE DIOLS FOR USE IN POLYCARBONATE URETHANES

CROSS-REFERENCE TO RELATED APPLICATIONS

This application is a continuation-in-part of application Ser. No. 681,012 entitled "Catalyst for Making Polycarbonate Diols for Use in Polycarbonate Urethanes" filed Apr. 28, 1976, now abandoned which in turn is a continuation-in-part of application Ser. No. 385,019 entitled "Transparent, Impact-Resistant Poly-(alkylenecarbonate Urethane) Laminates" filed Aug. 2, 1973, now abandoned.

BACKGROUND OF THE INVENTION

1. Field of the Invention

This invention relates to laminated glass articles, more particularly, to bilayer laminated safety glass comprising a polycarbonate urethane adhered to a sheet of glass.

2. Brief Description of the Prior Art

Safety glass is a well-known term for a glass sandwich composed of a plastic interlayer bonding together two glass plates or sheets so that the breaking of the glass results in minimum dispersion of fragments of broken glass. Laminated safety glass is widely used in automobiles and must possess a number of properties including: (1) high impact energy absorption to minimize concussive injury; (2) shear and tear strength sufficient to prevent rupture of the interlayer by broken glass; (3) sufficient adhesion between the interlayer and the glass to prevent dispersion of broken glass to minimize lacerative injury; and (4) good optical quality.

One difficulty encountered in present windshields is that upon breaking, sharp glass edges may develop which may then cause severe laceration. Bilayer windshields comprising an outer ply of glass and an inner ply of plastic have been suggested for minimizing lacerative injury. However, since the plastic layer will be exposed to the atmosphere, it must have, in addition to the properties enumerated above, good weathering properties, such as ultraviolet light and hydrolytic stability, in order to retain its desirable mechanical properties and optical quality.

Since about 1930, plasticized polyvinyl butyral has been the most widely used interlayer material. However, it has been used almost exclusively in conventional trilayer windshields. Polyvinyl butyral is particularly susceptible to moisture and is not amenable to fabrication in the form of a bilayer windshield in which a surface of the polyvinyl butyral is exposed to the atmosphere.

There has been a trend in recent years to provide a substitute plastic interlayer material for polyvinyl butyral. U.S. Pat. Nos. 3,388,032; 3,522,142 and 3,620,950 and Belgian Pat. No. 785,125 all disclose various polyurethane materials for use in fabricating motor vehicle safety glass. The polyurethane materials, in general, offer improved physical properties over the polyvinyl butyral in that they have better impact resistance at high tempratures and are not nearly so moisture sensitive.

U.S. Pat. No. 3,764,457 entitled "Transparent Impact Resistant Poly(Carbonate-Urethane) Laminate" to Chang et al. and assigned to PPG Industries, Inc., the assignee of the instant invention, discloses that polycarbonate urethanes, particularly polyoxyalkylenecarbonate urethanes, are useful as inerlayers for safety glass windshields. The polycarbonate urethanes therein are prepared by the reaction of a diisocyante, an active hydrogen compound and a hydroxy-terminated aliphatic polycarbonate having ether linkages. The preferred polycarbonates are prepared from (1) carbon dioxide and 1,2-epoxides, (2) cyclic carbonates such as ethylene carbonate or (3) cyclic carbonates and a 1,2-epoxide. However, the ultraviolet light sensitivity of polyoxyalkylenecarbonate urethanes curtails their usefulness in bilayer laminates. Other methods are disclosed by which polycarbonates without ether linkages can be prepared, such as by the transesterification reaction of ethylene, propylene or diethylene glycols and dimethyl, diethyl or diphenyl carbonates.

In U.S. Pat. No. 3,544,524 entitled "Polyurethane Polymers Prepared From a Chain Extender and the Transesterification Product of 1,6-Hexanediol with a Diaryl Carbonate" to Müller et al., polycarbonates of molecular weight 800 to 3000 are preferably prepared by the transesterification reaction of 1,6-hexanediol and diphenylcarbonate with removal of phenol by distillation. Müller et al. disclose that if polycarbonates are prepared by reacting 1,6-hexanediol with a dialkylcarbonate, the alkaline or acid ester interchange catalyst remains in the finished polycarbonate and adversely affects the quality of the polyurethane produced.

U.S. Pat. No. 2,789,966 entitled "Interpolycarbonates From 4,4'-bis(hydroxymethyl)-Biphenyl-bis(Alkyl or Aryl Carbonates)" to Reynolds et al. discloses novel interpolycarbonates prepared by co-condensing a primary bis-(carbonate) monomer having the formula

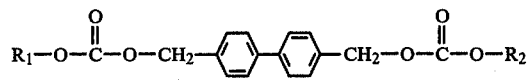

and a copolymerizable bis-(carbonate) monomer having one of the following formulae:

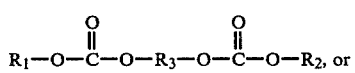

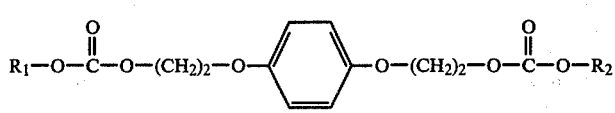

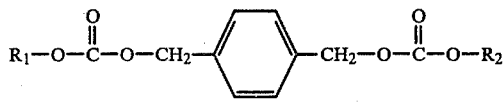

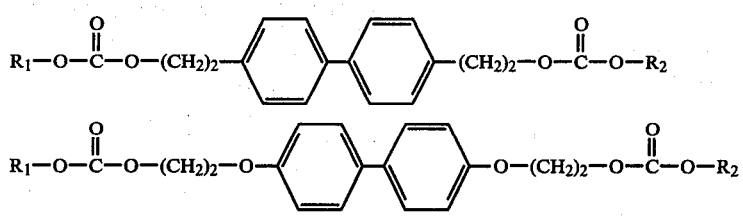

wherein R₁ and R₂ each represents an alkyl radical containing 1 to 4 carbon atoms or an aryl radical containing 6 to 8 carbon atoms and R₃ represents an alkylene radical containing 4 to 10 carbon atoms, in the presence of a catalyst selected from Ti(OR)₄ and ether complexes of TiX₄ wherein R represents an alkyl radical containing 1 to 18 carbon atoms and X represents a halogen. Reynolds et al. disclose the unusual advantages of employing a titanium catalyst where the primary bis-(carbonate) monomer and various copolymerizable bis-(carbonate) monomers yield interpolycarbonates which decompose in the presence of most ester-interchange catalysts.

In U.S. Pat. No. 3,379,693 entitled "Carbonate Compositions" Hostettler et al. disclose that novel carbonate compositions, 4-nitro-4 hydrocarbyloxymethyl - 2,6 dioxacyclohexanones, may be prepared by an aldol-like condensation of nitrosomethane and formaldehyde to produce tris-(hydroxymethyl)-nitromethane, which is then contacted with a halide (RX) to form a monoetherified product

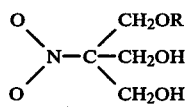

which can be reacted with a dialkyl carbonate in the presence of a titanate to form the novel compound

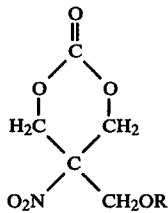

Such cyclic carbonates are polymerized by ring-opening and chain addition. The polycarbonates so formed may be reacted with organic polyisocyanates to form polyurethanes useful as printing rollers, solid tires, and mechanical goods such as gears, seals, O-rings and shoe heels.

SUMMARY OF THE INVENTION

It has now been discovered that polycarbonates prepared by the reaction of an aliphatic diol and a dialkyl carbonate in the presence of a titanium catalyst may be reacted with an organic diisocyanate to form particular transparent, energy-absorbing, moisture and ultraviolet stable urethane polymers which can be laminated to glass to provide safety glass which is impact-resistant over a wide temperature range, minimizing lacerative injury, and is superior to safety glass using polyvinyl butyral interlayers commercially employed at the present time.

More particularly, the urethane polymers of the present invention are formed from:
a) an aliphatic polycarbonate diol;
b) an organic diisocyanate; and, optionally
c) a compound containing at least two active hydrogens per molecule reactive with isocyanate groups and having a molecular weight of less than 250.

The urethane polymers of this invention, unlike analogous polymers perpared from polyoxyalkylenecarbonate segments, have excellent weathering resistance as measured by ultraviolet light stability and are hydrolytically stable, making them particularly useful for use in bilayer laminates.

DETAILED DESCRIPTION

Polycarbonate urethanes herein contemplated are preferably prepared from aliphatic polycarbonate diols, cycloaliphatic diisocyanates, and a compound containing at least two active hydrogens per molecule reactive with the isocyanate groups and having a molecular weight less than 250.

The polycarbonate diols of the present invention are synthesized according to the following reaction sequence:

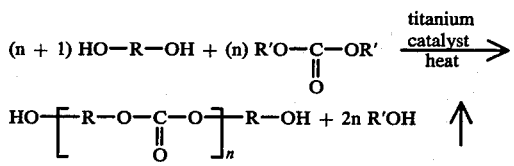

where n=4 to 46; R is an aliphatic group containing from 4 to about 10 carbon atoms; and R' is a lower alkyl group containing 1 to 4 carbon atoms. The aliphatic diol may be linear or cycloaliphatic. Preferred aliphatic diols include alkylene diols, especially 1,6 hexanediol. Diethyl carbonate is a preferred dialkyl carbonate.

The catalyst employed in the condensation of the aliphatic diol and dialkyl carbonate to form the polycarbonate diol is a titanium catalyst. The well-known acid or alkali metal-containing catalysts are not employed because of adverse effects when the polycarbonate diol is further reacted to form a polyurethane. The present invention eliminates the adverse effects on the polyurethane reaction by employing as the catalyst, in the condensation reaction of an aliphatic diol and a dialkyl carbonate to form a polycarbonte diol, a titanium compound which is substantially free from alkali metal. Such titanium compounds include compounds having the following general formulae:

TiX₄, wherein X is a halogen, particularly ether complexes of TiX₄;
(RR'R"R"'N)₂[Ti(OR)₆], and
(RR'R"R"'N)H[Ti(OR)₆], wherein R is any alkyl radical containing from 1 to 6 carbon atoms and need not be the same alkyl radical in every ester group, and R', R" and R'" (Referred to hereinafter collectively as R') may each be R or any aryl radical containing from 6 to 9 carbon atoms; and Ti(OR)$_4$, wherein R is any alkyl radical containing from 1 to 6 carbon atoms and need not be the same alkyl radical in every ester group; and alkyl esters of titanium which contain less than four ester groups, wherein the alkyl radicals contain from 1 to 6 carbon atoms and need not be the same alkyl radical in every ester group.

The preferred catalysts of the present invention are tetra-alkyl esters of titanium, particularly tetrabutyl titanate.

The reaction takes place under reflux conditions with the continuous elimination of R'OH. During the last stages of the reaction, the residual R'OH is removed by vacuum stripping. As shown in the above reaction scheme, a hydroxy-terminated aliphatic diol can be reacted with dialkyl carbonates such as methyl, ethyl, n-propyl and n-butyl carbonate. An excess of diol should be employed to insure that the polycarbonate is essentially completely hydroxy-terminated, rather than alkoxy-terminated.

The polycarbonate diols useful for preparing polycarbonate urethanes of the present invention have average molecular weights between 500 and 5000, preferably between 550 and 2500, and hydroxyl numbers between 224 and 22, preferably between 204 and 45. The molecular weights can be determined by hydroxyl end group analysis and by the formula:

$$\text{Average Molecular Weight} = \frac{(\text{functionality of polycarbonate diol}) (56.1) (1000)}{\text{hydroxyl number of polycarbonate diol}}$$

The hydroxyl number can be determined by adding pyridine and acetic anhydride to the polycarbonate diol and titrating the acetic acid formed with KOH as determined in *Ind. Eng. Chem. Anal.*, ed. 16, 541-49 and *Ind. Eng. Chem. Anal.*, 394 (1945). The hydroxyl number is defined as the milligrams of KOH per gram of polycarbonate diol.

The organic diisocyanate component is preferably an aliphatic diisocyanate, particularly a cycloaliphatic diisocyanate. The cycloaliphatic diisocyanates are not adversely affected by ultraviolet light and yield polyurethanes which have high impact energy absorption levels which make them desirable for bilayer safety glass applications. In addition, polyurethanes prepared with cycloalihatic diisocyanates are not adversely affected by conventional procesing temperatures. Polyurethanes made with analogous diisocyanates such as toluene diisocyanate and methylene diphenyl diisocyanate do not normally have as good impact energy absorption levels, are subject to ultraviolet light deterioration, and also are not as thermally stable as comparable polyurethanes made with cycloaliphatic diisocyanates.

In addition to the preferred 4,4'-methylene-bis-(cyclohexyl isocyanate), other useful dinuclear cyclic aliphatic diisocyanates are those which are formed through an alkylene group of from 1 to 3 carbon atoms inclusive, and which can be substituted with nitro, chlorine, alkyl, alkoxy and other groups which are not reactive with hydroxyl groups (or active hydrogens) providing they are not positioned so as to render the isocyanate group unreactive. Another preferred dinuclear cyclic aliphatic diisocyanate is 4,4'-isopropylidene-bis-(cyclohexyl isocyanate). A preferred mononuclear cyclic aliphatic diisocyanate is 1,4-cyclohexyl diisocyanate. Also, hydrogenated aromatic diisocyanates such as hydrogenated toluene diisocyanate may be employed. Dinuclear diisocyanates in which one of the rings is saturated and the other unsaturated, which are prepared by partially hydrogenating aromatic diisocyanates such as diphenyl methane diisocyanates, diphenyl isopropylidene diisocyanate and diphenylene diisocyanate may also be employed. Mixtures of cycloaliphatic diisocyanates with straight chain aliphatic diisocyanates and/or aromatic diisocyanates may also be employed. An example is 4,4'-methylene-bis-(cyclohexyl isocyanate) with commercial isomer mixtures of toluene diisocyanate or meta-phenylene diisocyanate. Thioisocyanates corresponding to the above diisocyanates can be employed as well as mixed compounds containing both an isocyanate and a thioisocyanate group. Diisocyanates are used herein including thioisocyanates and compounds both an isocyanate and a thioisocyanate group.

The polyurethanes can optionally be chain extended, depending upon the molecular weight of the polycarbonate diol, with a compound having two active hydrogens per molecule as determined by the Zerewitinoff test as described by Kohler in *Journal of the American Chemical Society*, 49 3181 (1927). The chain extenders should have molecular weights of less than 250 and are preferably aliphatic diols containing from 2 to 15 carbon atoms, such as ethylene glycol, 1,3-propanediol, 1,4-butanediol and 1,6-hexanediol, with 1,4-butanediol being the most preferred. Amino alcohols and diamines may also be employed. Examples include monoethanolamine and 1,2-ethylenediamine.

The polyurethane can also be cured with a compound having more than two active hydrogens per molecule. The resulting polyurethane will have thermosetting properties. Representative curing agents are polyols having at least three hydroxyl groups; such as trimethylol propane, trimethylol heptane, pentaerythritol and castor oil. Also suitable are mixed curing agents, such as polyols having three hydroxyl groups in conjunction with a low molecular weight diol such as ethylene glycol and 1,4-butanediol. The polyols can also be mixed with polyamines having two or more reactive amine groups.

Proportions of the ingredients employed will depend upon the particular ingredients employed and their molecular weight. In any event, the total number of labile or active hydrogen atoms is approximately equivalent to the number of isocyanate groups. The NCO to active or labile hydrogen ratio is generally from between 0.9-1.1 to 1.0. The mole ratio of diisocyanate to polycarbonate diol to chain extender should broadly fall within the following ranges:

| Component | Mole Ratio |
| --- | --- |
| cycloaliphatic diisocyanate | 1.0 to 9.4 |
| polycarbonate diol | 1.00 |
| chain extender | 0.0 to 8.4 |

The polyurethanes should be chain extended when the average molecular weight of the polycarbonate diol is above about 700 (especially between 1000-5000). Polyurethanes prepared with these higher molecular weight diols without the use of a chain extender have a tendency to crystalize and become opaque, making the urethanes unsuitable for motor vehicle glazing applications. Chain extending these polymers with a low molecular weight compound containing active hydrogens, such as 1,4-butanediol, increases the urethane content of the polymer making it more random, thereby reducing the tendency of the polymer to crystallize. With lower number average molecular weight polycarbonate diols, that is, those having molecular weights of below 700, particularly within the range of 500-600, chain extension is not necessary and is not recommended. Polyurethanes prepared with these lower molecular weight polycarbonate diols have sufficient randomness associated with the polymer to be amorphous and optically clear. Chain extending these polymers with a lower molecular weight active hydrogen-containing compound would introduce too high a urethane content into the polymer making it too stiff and rigid for automotive glazing applications. On the other hand, with high molecular weight polycarbonate diols, such as a poly(1,6-hexylenecarbonate) diol having an average molecular weight greater than 700, particularly between about 1000 and 5000, chain extending with a material such as 1,4-butanediol is recommended.

The relative proportions of polycarbonate diol and chain extender which should be employed are determined by the desired mechanical properties and the molecular weight of the polycarbonate diol. For example, when the average molecular weight of the polycarbonate diol is above 700, and especially between 1000 and 5000, the mole ratio of chain extender, such as 1,4-butanediol to polycarbonate diol should be about 1.25-5.70:1.00. When the polycarbonate diol is of lower average molecular weight, i.e., below 700 and particularly between 500 and 600, the mole ratio of lower molecular weight active hydrogen-containing compound, such as 1,4-butanediol, to polycarbonate diol is much less, about 0.0-0.4:1.0.

The following is a list of mole ratio ranges of the preferred polycarbonate urethanes useful in the practice of this invention.

| Component | Mole Ratio |
| --- | --- |
| cycloaliphatic diisocyanate | 1.000 |
| poly(alkylenecarbonate) diol, average molecular weight below 700, particularly between 500 to 600 | 1.000 |
| cycloaliphatic diisocyanate | 2.40 to 4.60 |
| poly(alkylenecarbonate) diol, average molecular weight greater than 700, particularly between 1000 to 3000 | 1.000 |
| chain extender | 1.40 to 3.60 |

The polycarbonate urethanes for the laminates of the invention can be prepared in several ways, namely, by the "one shot" or bulk polymerization method and by the prepolymer method. In the "one shot" or bulk polymerization method, all the ingredients, that is, isocyanate, polycarbonate diol and chain extender are mixed simultaneously. This method is generally satisfactory when all active hydrogens react at about the same rate such as when all contain hydroxyl groups as the only reactive sites. The urethane reaction is preferably conducted under anhydrous conditions with dry reactants such as in a nitrogen atmosphere of atmospheric pressure and at a temperature between 100° and 140° C. The polycarbonates are dried before reaction, usually to a moisture content of between about 0.01 to 0.05 percent. To obtain the randomness desired and a clear leathery polymer, the active hydrogen compound, for example, anhydrous 1,4-butanediol (containing a maximum of 0.04 percent water) is preferably added to the polycarbonate under a nitrogen atmosphere to exclude the moisture and the temperature maintained sufficiently high so that there is no phase separation and a homogeneous mixture is obtained. The diisocyanate, for example, 4,4'-methylene-bis-(cyclohexyl isocyanate), is preferably added rapidly and the temperature of the mixture maintained above about 75° C. so that there is no phase separation and the mixture remains homogeneous. The mixture is then preferably vigorously agitated at a temperature of at least about 75° C. and degassed for a period of at least about 3 minutes during which time the pressure is reduced from atmospheric to about 3 millimeters of mercury. The reduction in pressure facilitates the removal of the dissolved gases such as nitrogen and carbon dioxide and then the ingredients are preferably reacted at a temperature of between about 110° and 140° C. in the presence of a catalyst and the reaction continued for at least about 6 hours until there are substantially no isocyanate groups. The isocyanate content of the polymer will be less than 0.6 percent by weight isocyanate groups and preferably less than 0.3 percent by weight. In the absence of a catalyst, the reaction can be conducted for at least about 24 hours, preferably under a nitrogen atmosphere. The resultant polymer is preferably then cut while warm, granulated, extruded and/or milled and calendered to sheets and assembled into laminates and aged for several days or a week at room temperature.

Polymers having the desired random distribution can also be prepared by the prepolymer method, when the polycarbonate is treated with an excess of the amount of diisocyanate required to end cap it, or more than 2 moles of diisocyanate per mole of polycarbonate. Generally about 3 moles of diisocyanate per mole of polycarbonate are required, more preferably, 4 moles or more. Then the active hydrogen compound can be reacted with the prepolymer. When the prepolymer method is employed, the prepolymer and chain extender are preferably heated so as to reduce the prepolymer viscosity to about 200 or at most a few thousand centipoises so as to aid in mixing. As in the bulk polymerization, reaction should be conducted under anhydrous conditions with dry reactants.

An important criterion of the polycarbonate urethane is that it should be transparent at least when in the form of a thin sheet as it is used in safety glass. It has been discovered that appropriate clear or haze-free films are provided when the urethane reactants are made homogeneous and reacted at a temperature of about 110° C. to about 140° C. or above. In many cases, however, additional steps are necessary in order to obtain haze-free clear polymer. For example, some compositions made from high molecular weight polycarbonates such as 3000 molecular weight are translucent, unless the reaction rates of the reactants are controlled to obtain a random distribution such as by the use of a catalyst or by conducting the reaction at higher temperatures.

It is believed that the unusual energy absorption properties and transparency are not only dependent upon the urethane ingredients and proportions but on the method of preparation. More particularly, it is believed that the presence of polyurethane regular block segments adversely bears upon the polyurethane transparency and energy absorption properties and consequently it is believed that a random polymer is necessary for optimum results. Consequently, whether the urethane contains random or regular block segments depends upon the particular reagents and their relative reactivity as well as the conditions of reaction. Generally speaking, the diisocyanate will be more reactive with the low molecular weight active hydrogen compound, for example, 1,4-butanediol, than with the hydroxy-terminated polycarbonate and, hence, care is required to inhibit the preferential reaction between the butanediol and the diisocyanate such as by rapidly adding the diisocyanate to an intimate mixture of the butanediol and polycarbonate with vigorous agitation, preferably at a temperature of at least about 75° C. when no catalyst is employed, and then maintained at temperature of reaction at at least about 110° C. after the exotherm has subsided. When a catalyst is employed, the mixing temperature will generally be lower such as about 60° C. so that the exotherm does not carry the temperature of the mixture substantially above the reaction temperature desired. Inasmuch as the polyurethanes are thermally stable, however, reaction temperatures can reach as high as 200° C. and as low as 60° C. A preferred temperature range is between about 75° C. and about 130° C. when a catalyst is employed and more preferably between about 80° and about 100° C. When no catalyst is employed, the reaction temperature is preferably between about 130° C. and 150° C.

It is also important to rapidly attain reaction temperatures after a homogeneous mixture is obtained, when a catalyst is not employed, so that the polymer does not become hazy. For example, it has been found that some mixtures become hazy in less than one-half hour at 50° C. Thus, it is important either to use a catalyst or, by introducing the reactants at a reaction temperature such as by the use of a high-speed shear mixing head (see, or example, U.S. Reissue Pat No. Re. 24,514 to Hoppe et al.), to rapidly reach the reaction temperature such as above about 130° C., so that the polymer does not become hazy.

Although not required for all reactions, catalysts, for example, tin catalysts such as dibutyl tin dilaurate, stannous octoate and butyl stannoic acid, are preferably employed. Catalyst concentrations range from 0.0057 to 0.015 percent by weight based on total formula weight. Optionally, ultraviolet light absorbers such as 2,4-dihydroxy benzophenone can be employed. Thermal stabilizers such as dilauryl thiodipropionate are also optional. Concentrations of these optional ingredients range from 0.10 to 0.20 percent by weight based on total formula weight.

After reaction is substantially complete, the polymer is preferably transferred directly to an extruder and extruded and/or milled and calendered to the desired thickness or the partially polymerized material can be further polymerized in the forming equipment. Conventional rubber mills and extruders can be employed to form the polymer into sheet form. The material is then preferably sandwiched between a non-adhered protecting material such as polyethylene to exclude dust and preferably sealed in a container to exclude moisture. It may be desirable to coat the polymer with a powder such as sodium bicarbonate in order to prevent adjacent sheets from adhering to each other. Before use in a laminate, it is desirable to control the moisture content in a polymer such as by drying in an oven at a temperature of between about room temperature and about 49° C. for from a few hours up to about 3 days or more. Before lamination, the powder, if employed, can be removed in a water bath before the sheet is dried. The polyurethane can then be assembled with other materials to form the desired laminate.

Since the polycarbonate urethanes of the invention are to be used in glass laminates, an adhesion control agent to maintain the desired level of adhesion of the polyurethane to glass may be necessary. Suitable adhesion promoters are alkoxy silanes, such as glycidyl-oxy-propyltrimethoxy silane sold by the Dow Corning Company under the trademark Z-6040. The adhesion control agent is preferably incorporated into the urethane reactants in concentrations of about 0.10 to 0.20 percent by weight based on total formula weight. In some cases an adhesion control agent such as an akyl acid phosphate may be necessary as disclosed in Canadian Pat. No. 861,469. Particularly preferred are stearyl acid phosphate and lauryl acid phosphate which have been observed to effect the desirable controlled adhesion with excellent diaphragm action and glass retention when the laminate is broken. It has been found that when some laminates are prepared by cast-in-place method, as generally described below, an adhesion inhibitor is necessary as this method produces laminates in which the urethane is quite strongly adhered to the glass. Inhibitors are preferably added to the urethane reactants and are present in a concentration of about 0.05 to 0.12 percent by weight based on total formula weight. In certain instances, it is desirable to use an adhesion promoter and an adhesion inhibitor in combination. In this way, desirable low degree of adhesion of the polyurethane to glass is obtained but yet this low degree of adhesion can be maintained even under extremely high humidity conditions. A particularly desirable combination is from 0.1 to 0.12 percent by weight stearyl acid phosphate plus about 0.2 percent by weight gamma-glycidoxy propyltrimethoxy silane. Other desirable combinations of adhesion control additives are disclosed in U.S. Pat. No. 3,900,686 to Ammons which is incorporated by reference herein.

The preferred, fully cured polycarbonate urethanes have inherent viscosities at 30° C. in 0.5 percent solution of silica stabilized chloroform or N-methyl-2-pyrrolidone of between about 0.60 and 1.40, preferably between about 1.0 and 1.3. Preferred polycarbonate urethanes of the invention can be characterized as plastomers, that is, they are elastoplastic and thus do not snap back as true elastomer when stretched. In addition, they are clear, flexible and essentially non-adhesive at room temperature and generally have between about −20° C. and 50° C. a relatively constant Gehman modulus of $10^7$ and $10^{9.5}$ log of 3 times the shear modulus in dynes per square centimeter as measured according to A.S.T.N. D-1053-65.

The preferred polycarbonate urethanes used in this invention will generally have an average molecular weight, as estimated from inherent viscosity measurements, between about 10,000 and 100,000 preferably between about 20,000 and 65,000. In addition, the optically clear urethanes upon heating will generally exhibit a low temperature endotherm at about 70° C. (differential thermal analysis can be done with a du Pont 900 thermal analyzer), and generally no endotherm or exotherm occurs between 100° C. and and 170° C., indicating that the polymers are amorphous. Softening points of about 120°–160° C., melting points of about 160°–200° C., and decomposition temperatures of about 250°–290° C. are typical. Preferred compositions suitable for use in automobile windshields meet the standard requirement of minimum light transmission of 70 percent and preferably 86.5 percent or above (Illuminant A. Tungsten lamp 2,840° K.) and less than 2 percent haze (ANSI CODE Z-26.1, 1966, Test No. 18). The percent light transmission and percent haze can be measured by a Hunter Pivotable Sphere Haze Meter.

To fabricate safety glass laminates of the present invention, laminating can be conducted with a preformed polyurethane sheet or with the reactive ingredients. Laminating with a preformed plastic sheet is conducted in two stages, a first "prepressing" stage and a second "autoclaving" stage. The prepressing stage can be performed using rubber tubing edge channels as described in U.S. Pat. No. 2,948,645. In this method, a matching pair of thin glass sheets are assembled with a preformed polyurethane sheet therebetween to form a sandwich structure. The sheets of glass can be either annealed or tempered. To fabricate a bilayer laminate, the interior surface of one of the glass plates is coated with a release agent which will permit the polyurethane interlayer material to release easily from the glass upon completion of the lamination. The release material must be able to withstand the temperature and pressures of the subsequent laminating operation and should be substantially inert in relation to the plastic innerlayer material. Further, the release material should not induce any optical distortion at any time in the plastic innerlayer surface. Suitable release agents which meet the above requirements are, for example, polyvinyl fluoride, fluorinated ethylenepropylene copolymers and polytetrafluoroethylene, the latter being commercially available from E. I. du Pont de Nemours and Company under the trademark TEFLON ®. After the sandwich structure has been assembled, the rubber tubing is fitted around the marginal edge of the sandwich and connected to a vacuum source. The prepressing operation is performed at a temperature of about 225° F. to 300° F. (about 107° C. to 149° C.) for about 10 to 15 minutes using a vacuum of about 26 to 28 inches of mercury. This prepressing operation removes all the air between the plies of glass, the plastic innerlayer material and the release material, thus permitting subsequent lamination to take place without the development of air bubbles at the glass-polyurethane surface. Another method of "prepressing" involves using modification of the so-called "vacuum bag technique" as generally described in U.S. Pat. No. 3,311,517. In this method, the sandwich construction is placed in a plastic bag, for example, a silicone rubber bag, which is inserted in an oven. With the exception of an air exhaust valve, the bag is then sealed to form an air-tight closure. The bag is evacuated through the air exhaust valve for about 5 minutes at a vacuum of about 26 to 28 inches of mercury. Temperature of the oven is then increased to about 300° F. (about 149° C.) and the temperature and vacuum held from 7 to 10 minutes to prepress the samples.

After all the air has been removed from the glass-plastic innerface by prepressing, the prepressed glass-plastic-glass sandwiches are then passed into an oil autoclave or other suitable high pressure equipment and heated to a temperature of about 250° F. to about 375° F. (about 121° C. to about 191° C.) and at a pressure between 50 and 500 pounds per square inch for about 5 to 10 minutes to laminate the sandwich. The temperature of the oil is then reduced to about 150° F. (about 66° C.), the pressure is released and the sandwich sample removed from the autoclave.

The polyurethane can also be adhered to the glass by casting it as a liquid prepolymer against the glass surface and curing the polyurethane in place against the glass. It has been found that when a glass-plastic bilayer is prepared in this manner, particularly strong bond is effected at the glass-plastic interface. The casting and curing-in-place technique essentially involves pouring or pumping uncured or partially cured resinous polyurethane material into a glass casting cell which consists of two spaced-apart glass sheets. If a motor vehicle windshield is to be fabricated, the glass sheets are bent and matched to one another. Glass bending matched pairs of glass sheets is well known in the art and can be done by the gravity-sagging technique as described in U.S. Pat. No. 3,248,196 and also by the "press bending" technique as described in U.S. Pat. No. 3,136,618. The matched pairs of bent glass sheets are held in a spaced-apart relationship by an adhesive-spacer element which is positioned between and around the perimeter of the glass sheets. A suitable spacer-adhesive element is, for example, a ¼ inch (6.35 millimeter) wide strip of 10 to 75 mil (about 0.25 to 1.9 millimeter) thick foam polyurethane tape which is commercially available from the Minnesota Mining Manufacturing Company. The thickness of the foam tape will determine the thickness of the plastic ply and thicker and thinner tapes are commercially available. The foam tape strip is continuous except where it is tightly butt-joined at the four corners of the windshield and except for about a 4 to 8 inch (about 10 to 20 centimeter) wide space near the center of one of the longer windshield edges which is devoid of foam tape to provide an opening for filling the casting cell with liquid resin. The foam polyurethane tape is an open cell foam and allows the air from the interior space of the cell to exit at any point along the edge while the cell is filling, but does not allow passage of any liquid resin.

One interior surface of the casting cell should be coated with a release agent so that after the resinous interlayer material has been cast and cured in place, the glass sheet with the release surface can be easily separated from the cured interlayer material. For a bilayer windshield, this should be the concave interior surface. It should be noted that at this point instead of a glass back-up plate coated with a release agent, the casting cell could be made with a solid release material such as a smooth, metal element. However, because the casting and curing operation is conducted at elevated temperatures, it is desirous to construct both major walls of the casting cell with a material which has the same thermal coefficient of expansion so as to minimize chances of inducing any optical distortion into the plastic innerlayer. Also, because thickness uniformity of the innerlayer is particularly critical in windshield applications, it is desirous to construct the casting cell from two matched windshield elements which have been bent in matched fashion on a bending roll as described above. Thus, the glass back-up plate with a release material coated on it is preferred to a polished metal plate. The release material should, of course, be inert to the resinous innerlayer material and should be able to withstand temperature of casting and curing in place. Further, it should permit easy separation of the glass back-up plate from the cured innerlayer material inducing no resultant optical distortion. Suitable release agents for casting and curing in place include the fluorinated compounds mentioned above as release materials for laminating preformed polycarbonate urethane sheet.

Casting may be accomplished by merely pouring the resin into the cell, but preferably casting is accomplished by pumping a metered quantity of liquid resin into the interlayer space. After the resinous innerlayer has been cast, the windshield cell is sealed and the resin is permitted to cure in place. The time and temperature of cure will be from about 230° to 290° F. (about 110° C. to about 143° C.) for a time of about 24 hours. If a catalyst is present in the polyurethane, the cure time can be significantly reduced to about 6 to 8 hours.

The safety glass laminates of this invention employing polycarbonate urethanes have excellent resistance to impact over a wide temperature range, and particularly at about 70° F. (about 21° C.). For example, when an approximately 0.032 inch (about 0.8 millimeter) thick polyalkylenecarbonate urethane film is laminated to a 7/32 inch (about 5.6 millimeters) thick 12 inch by 12 inch (0.3 meter by 0.3 meter) float glass sheet to form a bilayer laminate and the laminate is held rigid and impacted on the urethane side with a 5-pound freely falling ball, the mean penetration velocity of the laminate at 70° F. (about 21° C.) will be about 30 miles per hour. The mean penetration velocity test is described in more detail in Example III infra.

The glass employed in the present invention can be of any type depending upon the intended use for the laminate but preferably is a clear, low colored, transparent type of glass such as the well-known silica type of glass, particularly soda-lime-silica glass. The nature and composition of various silica glasses is well known in the art and is described, for example, in the *Encyclopedia of Chemical Technology* by Kirk Othmer, published by Interscience Encyclopedia Inc., New York, New York, volume 7, pages 181–189. The glass can be strengthened by either thermal or chemical tempering.

For automobile and other vehicle windshields, the glass will preferably have a thickness of between about 0.065 inch and 0.250 inch (about 1.65 to about 6.35 millimeters). Although the thickness of the innerlayer can vary between about 5 mils and 120 mils (about 0.127 millimeters and about 3.048 millimeters) or more, it is preferably between about 15 and about 45 mils (about 0.381 and 1.143 millimeters) for automobile windshields in order to obtain maximum transparency, low haze, and good diaphragm action when ruptured.

The following examples will serve to illustrate the invention and preferred embodiments.

EXAMPLE I

A polycarbonate diol is prepared by reacting 1,6 hexanediol and diethylcarbonate in the presence of tetrabutyl titanate catalyst. To a mixture of 17 moles of 1,6 hexanediol and 16 moles of diethyl carbonate is added 0.4 part per 100 parts by weight of the starting materials of a solution of 10 percent by weight tetrabutyl titanate in 1,4 butanediol. This amounts to about 400 parts per million by weight of tetrabutyl titanate. The reaction mixture is refluxed under a nitrogen atmosphere while the temperature is maintained between about 130° and about 170° C., distilling off ethyl alcohol as the reaction proceeds. Near the end, the mixture is subjected to vacuum to drive the reaction to completion and strip off the last traces of ethyl alcohol. The resulting polycarbonate diol has a hydroxyl number of 90.4 (assuming complete difunctionality) and a molecular weight of 1241.

EXAMPLE II

A polyurethane is prepared by reacting the polycarbonate diol of Example I with a cycloaliphatic diisocyanate and a monomeric aliphatic diol. A reaction kettle is charged with 1,000 mole of the polycarbonate diol, 2.812 moles of 4,4'-methylene-bis-(cyclohexyl isocyanate), commercially available as HYLENE W® from E. I. DuPont de Nemours and Company, and 1.812 moles of 1,4 butanediol. To this reaction mixture are added 0.04 parts of stearyl acid phosphate and 0.12 parts gamma-glycidoxypropyltrimethoxysilane, commercially available as Z-6040 silane from Dow Corning, per 100 parts by weight of the starting materials to control adhesion of the resultant polyurethane. The reaction is carried out at 290° F. (about 143° C.) for about 24 hours. The product is a transparent polymer characterized by calculated urethane content of 15.5 percent, hard segment 29.79 percent, and cyclic segment 21.54 percent, and a measured Shore A hardness of 98.

EXAMPLE III

The polycarbonate urethane of Example II is cast as a film of approximately 0.030 inch (about 0.76 millimeter) thickness. The film is assembled between two 12 inch by 12 inch (0.3 meter by 0.3 meter) plies of glass, one of which is coated with a release agent on the surface contacting the film. The assembly is placed in a plastic bag which is evacuated and sealed and placed in an oil autoclave at 300° F. (about 149° C.) and 200 psi (about $1.38 \times 10^6$ Newtons per square meter) for 45 minutes to effect lamination. The release ply is removed leaving a glass-polyurethane bilayer laminate. The initial adhesion of the film to the glass is 18 to 20 pli (about 3150 to 3500 Newtons per meter). A bilayer laminate subjected to 100 percent relative humidity at 120° F. (about 49° C.) for 1 day retains adhesion of 6 to 9 pli (about 1050 to 1575 Newtons per meter), while a bilayer laminate with no adhesion control agents subjected to such conditions loses all adhesion to glass in one day. A bilayer laminate of the present example subjected to such conditions for 4 days retains adhesion of 4 to 6 pli (about 700 to 1050 Newtons per meter). A 12 inch by 12 inch (0.3 meter by 0.3 meter) bilayer laminate of 7/32 inch (about 5.6 millimeters) thick float glass and 0.032 inch (about 0.8 millimeter) thick polycarbonate urethane is held rigid in a frame and impacted from the film side at 70° F. (about 21° C.) by a 5 pound (2.27 kilogram) freely falling ball. The break height, the from which the ball may be dropped without penetrating the laminate, is 43 feet (about 13.1 meters), corresponding to a penetration velocity of 35.85 miles per hour (about 57.7 kilometer per hour).

The above examples are offered to illustrate the invention and are not intended to limit its scope which is defined by the accompanying claims.

I claim:
1. A polyurethane which is the reaction product of:
   a. a polycarbonate diol having a molecular weight between 500 and 5000 prepared by the reaction of a hydroxy-terminated aliphatic diol with a dialkyl carbonate in the presence of a titanium catalyst, said catalyst being a titanium compound which is substantially free from alkali metal; and
   b. an organic diisocyanate.
2. The polyurethane as described in claim 1, wherein the molecular weight of the polycarbonate diol is below

700 and a and b are present in substantially equimolar ratio.

3. The polyurethane as described in claim 1, wherein the titanium catalyst is a titanium compound selected from the group consisting of:
 $TiX_4$, wherein X is a halogen; ether complexes of $TiX_4$; $(RR'_3N)_2[Ti(OR)_6]$, and
 $(RR'_3N)H[Ti(OR)_6]$, wherein R is an alkyl group having from one to six carbon atoms and R' is R or an aryl group having from six to nine carbon atoms;
 $Ti(OR)_4$, wherein R is an alkyl group having from one to six carbon atoms; and
 titanium alkyl esters having from one to three ester groups wherein the alkyl group contains from one to six carbon atoms.

4. The polyurethane as described in claim 3 wherein the titanium catalyst is tetrabutyl titanate.

5. The polyurethane as described in claim 3 wherein the diisocyanate is a cycloaliphatic diisocyanate.

6. A polyurethane which is the reaction product of:
 a. a polycarbonate diol having a molecular weight between 500 and 5000 prepared by the reaction of a hydroxy-terminated aliphatic diol with a dialkyl carbonate in the presence of a titanium catalyst, said catalyst being a titanium compound which is substantially free from alkali metal;
 b. an organic diisocyanate; and
 c. an organic compound containing at least two isocyanate-reactive hydrogens and having a molecular weight below 250.

7. The polyurethane as described in claim 6, wherein the organic compound containing at least two isocyanate-reactive hydrogens is a monomeric hydroxy-terminated aliphatic diol.

8. The polyurethane as described in claim 6, wherein the molecular weight of the polycarbonate diol is greater than about 700 but less than about 5000 and the molar ratio of c:a is about 1.25 to 5.70:1.00.

9. The polyurethane as described in claim 6, wherein the titanium catalyst is a titanium compound selected from the group consisting of:
 $TiX_4$, wherein X is a halogen; ether complexes of $TiX_4$; $(RR'_3N)_2[Ti(OR)_6]$, and
 $(RR'_3N)H[Ti(OR)_6]$, wherein R is an alkyl group having from one to six carbon atoms and R' is R or an aryl group having from six to nine carbon atoms;
 $Ti(OR)_4$, wherein R is an alkyl group having from one to six carbon atoms; and
 titanium alkyl esters having from one to three ester groups wherein the alkyl group contains from one to six carbon atoms.

10. The polyurethane as described in claim 9, wherein the titanium catalyst is tetrabutyl titanate.

11. The polyurethane as described in claim 6, wherein the organic diisocyanate is a cycloaliphatic diisocyanate.

12. The polyurethane as described in claim 11, wherein the cycloaliphatic diisocyanate is 4,4'-methylene-bis (cyclohexyl isocyanate).

13. The polyurethane as described in claim 6, wherein the molecular weight of the polycarbonate diol is between about 1000 and about 3000 and the molar ratio of a:b:c is about 1.00:2.40 to 4:60:1.40 to 3.60.

14. The polyurethane as described in claim 13, wherein the polycarbonate diol is prepared by the reaction of diethyl carbonate and a hydroxy-terminated alkylene diol containing from 4 to about 10 carbon atoms.

15. A safety glass laminate comprising:
 a. a ply of glass; and
 b. laminated to said ply of glass a ply of transparent, energy-absorbing polycarbonate urethane which is the reaction product of
  (1) a polycarbonate diol having a molecular weight between 500 and 5000 prepared by the reaction of a hydroxy-terminated aliphatic diol and a dialkyl carbonate in the presence of a titanium catalyst said catalyst being a titanium compound which is substantially free from alkali metal; and
  (2) an organic diisocyanate.

16. The laminate as described in claim 15, wherein said polyurethane is the reaction product of
 a. a polycarbonate diol of molecular weight less than about 700 prepared in the presence of a titanium catalyst selected from the group consisting of:
  $TiX_4$, wherein X is a halogen; ether complexes of $TiX_4$; $(RR'_3N)_2[Ti(OR)_6]$ and
  $(RR'_3N)H[Ti(OR)_6]$, wherein R is an alkyl group having from one to six carbon atoms and R' is R or an aryl group having from six to nine carbon atoms;
  $Ti(OR)_4$, wherein R is an alkyl group having from one to six carbon atoms; and
  titanium alkyl esters having from one to three ester groups wherein the alkyl group contains from one to six carbon atoms; and
 b. a cycloaliphatic diisocyanate in substantially equimolar ratio.

17. The laminate as described in claim 16, wherein the titanium catalyst is tetrabutyl titanate.

18. A safety glass laminate comprising:
 a. a ply of glass; and
 b. laminated to said ply of glass, a ply of transparent, energy-absorbing polycarbonate urethane which is the reaction product of:
  (1) a polycarbonate diol having a molecular weight between 500 and 5000 prepared by the reaction of a hydroxy-terminated aliphatic diol and a dialkyl carbonate in the presence of a titanium catalyst, said catalyst being a titanium compound which is substantially free from alkali metal;
  (2) an organic diisocyanate; and
  (3) an organic compound which contains at least two isocyanate-reactive hydrogens and has a molecular weight less than about 250.

19. The laminate as described in claim 18, wherein said polyurethane is the reaction product of:
 a. a polycarbonate diol having a molecular weight between about 1000 and about 3000 prepared by the reaction of diethyl carbonate and a hydroxy-terminated alkylene diol containing from 4 to about 10 carbon atoms in the presence of a titanium catalyst selected from the group consisting of:
  $TiX_4$, wherein X is a halogen; ether complexes of $TiX_4$; $(RR'_3N)_2[Ti(OR)_6]$, and
  $(RR'_3N)H[Ti(OR)_6]$, wherein R is an alkyl group having from one to six carbon atoms and R' is R or an aryl group having from six to nine carbon atoms;
  $Ti(OR)_4$, wherein R is an alkyl group having from one to six carbon atoms; and
  titanium alkyl esters having from one to three ester groups wherein the alkyl group contains from one to six carbon atoms;

b. a cycloaliphatic diisocyanate; and
c. a monomeric hydroxy-terminated aliphatic diol; the molar ratio of a:b:c being about 1.00:2.40 to 4.60:1.40 to 3.60.

20. The laminate as described in claim 19, wherein the thickness of said ply of glass is from about 0.065 inch to about 0.250 inch and the thickness of said polyurethane is from abut 0.005 inch to about 0.120 inch.

21. The laminate as described in claim 20, which comprises a ply of polycarbonate urethane and only one ply of glass, wherein the thickness of said ply of glass is from about 0.125 inch to about 0.235 inch.

22. The laminate as described in claim 21, wherein the thickness of said polyurethane is from about 0.015 inch to about 0.045 inch.

* * * * *